United States Patent
Tu et al.

(10) Patent No.: US 9,489,125 B2
(45) Date of Patent: Nov. 8, 2016

(54) TOUCH PROCESSING METHOD AND SYSTEM USING A GUI IMAGE

(75) Inventors: Yen-Hung Tu, Taipei (TW);
Chung-Lin Chia, Zhongli (TW);
Han-Chang Chen, New Taipei (TW);
Wen-Chieh Pan, New Taipei (TW)

(73) Assignee: Rich IP Technology Inc., Taipei (TW)

( * ) Notice: Subject to any disclaimer, the term of this patent is extended or adjusted under 35 U.S.C. 154(b) by 1190 days.

(21) Appl. No.: 13/288,370

(22) Filed: Nov. 3, 2011

(65) Prior Publication Data

US 2013/0091449 A1  Apr. 11, 2013

(30) Foreign Application Priority Data

Oct. 6, 2011  (TW) .............................. 100136228 A (51) Int. Cl.
*G06F 3/0488* (2013.01)
*G06F 3/041* (2006.01)
*G06F 3/0481* (2013.01)

(52) U.S. Cl.
CPC ......... *G06F 3/04883* (2013.01); *G06F 3/0416* (2013.01); *G06F 3/0488* (2013.01); *G06F 3/04812* (2013.01); *G06F 3/0418* (2013.01); *G06F 2203/04808* (2013.01)

(58) Field of Classification Search
CPC ................. G06F 2203/04808; G06F 3/04812; G06F 3/0488–3/04886; G06F 3/0416–3/0418
See application file for complete search history.

(56) References Cited

U.S. PATENT DOCUMENTS

| | | | |
|---|---|---|---|
| 5,511,148 A * | 4/1996 | Wellner | 358/1.6 |
| 6,567,109 B1 * | 5/2003 | Todd | 715/862 |
| 6,723,929 B2 * | 4/2004 | Kent | G06F 3/0418 178/18.01 |
| 6,882,337 B2 * | 4/2005 | Shetter | 345/173 |
| 7,489,306 B2 * | 2/2009 | Kolmykov-Zotov et al. | 345/173 |
| 7,499,039 B2 * | 3/2009 | Roberts | 345/177 |
| 7,649,807 B2 * | 1/2010 | Ing | 367/118 |
| 7,663,607 B2 * | 2/2010 | Hotelling et al. | 345/173 |
| 7,683,890 B2 * | 3/2010 | Geaghan | 345/173 |
| 8,013,839 B2 * | 9/2011 | Ording et al. | 345/157 |
| 8,013,846 B2 * | 9/2011 | Bayramoglu et al. | 345/177 |
| 8,269,511 B2 * | 9/2012 | Jordan | 324/679 |
| 8,378,974 B2 * | 2/2013 | Aroyan | G06F 3/0436 178/18.01 |
| 8,692,810 B2 * | 4/2014 | Ing | G01N 29/069 345/173 |
| 8,907,930 B2 * | 12/2014 | Alberth | G06F 3/0418 178/18.04 |
| 8,913,039 B2 * | 12/2014 | Nikolovski | G06F 3/0416 178/18.04 |
| 8,988,356 B2 * | 3/2015 | Tseng | 345/172 |
| 9,086,764 B2 * | 7/2015 | LeBlanc | G06F 3/043 |
| 2002/0015064 A1 * | 2/2002 | Robotham et al. | 345/863 |
| 2003/0189731 A1 * | 10/2003 | Chang | 358/3.28 |
| 2004/0075671 A1 * | 4/2004 | Vale et al. | 345/660 |
| 2004/0136564 A1 * | 7/2004 | Roeber et al. | 382/100 |

(Continued)

OTHER PUBLICATIONS

Rekimoto, Jun. "SmartSkin: an infrastructure for freehand manipulation on interactive surfaces." Proceedings of the SIGCHI conference on Human factors in computing systems. ACM, 2002.*

(Continued)

*Primary Examiner* — Eric Wiener
(74) *Attorney, Agent, or Firm* — Lynette Wylie; Apex Juris, pllc.

(57) ABSTRACT

A touch processing method and system using a GUI image, the method including the steps of: reading a sensed data array from a touch panel; performing a conversion procedure on a GUI to generate a GUI image; and performing a touch processing procedure according to the sensed data array and the GUI image.

19 Claims, 8 Drawing Sheets

(56) References Cited

U.S. PATENT DOCUMENTS

| | | | |
|---|---|---|---|
| 2004/0160421 A1* | 8/2004 | Sullivan | 345/173 |
| 2005/0012723 A1* | 1/2005 | Pallakoff | 345/173 |
| 2005/0083313 A1* | 4/2005 | Hardie-Bick | G06F 3/0433 345/177 |
| 2005/0146512 A1* | 7/2005 | Hill et al. | 345/173 |
| 2005/0146513 A1* | 7/2005 | Hill et al. | 345/173 |
| 2005/0174338 A1* | 8/2005 | Ing | G06F 3/0433 345/177 |
| 2006/0022956 A1* | 2/2006 | Lengeling et al. | 345/173 |
| 2006/0139339 A1* | 6/2006 | Pechman et al. | 345/177 |
| 2006/0197750 A1* | 9/2006 | Kerr | G06F 1/1626 345/173 |
| 2006/0279548 A1* | 12/2006 | Geaghan | 345/173 |
| 2007/0085821 A1* | 4/2007 | Ing | G06F 3/041 345/156 |
| 2007/0120833 A1* | 5/2007 | Yamaguchi et al. | 345/173 |
| 2007/0296829 A1* | 12/2007 | Nakamura | H04N 5/2251 348/229.1 |
| 2008/0122798 A1* | 5/2008 | Koshiyama et al. | 345/173 |
| 2008/0158169 A1* | 7/2008 | O'Connor et al. | 345/173 |
| 2008/0168403 A1* | 7/2008 | Westerman et al. | 715/863 |
| 2008/0309632 A1* | 12/2008 | Westerman et al. | 345/173 |
| 2009/0116339 A1* | 5/2009 | Ing | G06F 3/0436 367/129 |
| 2009/0195517 A1* | 8/2009 | Duheille et al. | 345/177 |
| 2009/0309851 A1* | 12/2009 | Bernstein | 345/174 |
| 2010/0053105 A1* | 3/2010 | Choi | G06F 3/04886 345/173 |
| 2010/0079413 A1* | 4/2010 | Kawashima et al. | 345/175 |
| 2010/0083190 A1* | 4/2010 | Roberts et al. | 715/863 |
| 2010/0116563 A1* | 5/2010 | Paradiso | G06F 3/0433 178/18.04 |
| 2010/0227689 A1* | 9/2010 | Brunet de Courssou et al. | 463/37 |
| 2010/0229090 A1* | 9/2010 | Newton et al. | 715/702 |
| 2010/0235793 A1* | 9/2010 | Ording et al. | 715/863 |
| 2010/0288108 A1* | 11/2010 | Jung | G06F 3/0488 84/610 |
| 2010/0289754 A1* | 11/2010 | Sleeman et al. | 345/173 |
| 2010/0315266 A1* | 12/2010 | Gunawardana et al. | 341/22 |
| 2010/0315372 A1* | 12/2010 | Ng | 345/174 |
| 2011/0080430 A1* | 4/2011 | Nishibe et al. | 345/661 |
| 2011/0096010 A1* | 4/2011 | Todoroki | 345/173 |
| 2011/0115734 A1* | 5/2011 | Harashima et al. | 345/173 |
| 2011/0130096 A1* | 6/2011 | Dunkars | 455/41.2 |
| 2011/0134061 A1* | 6/2011 | Lim | G06F 3/016 345/173 |
| 2011/0134067 A1* | 6/2011 | Joguet et al. | 345/173 |
| 2011/0137968 A1* | 6/2011 | Ing | G06F 3/043 708/201 |
| 2011/0205185 A1* | 8/2011 | Newton et al. | 345/175 |
| 2011/0261655 A1* | 10/2011 | Aklil | G06F 3/0436 367/125 |
| 2011/0320978 A1* | 12/2011 | Horodezky et al. | 715/823 |
| 2012/0062474 A1* | 3/2012 | Weishaupt et al. | 345/173 |
| 2012/0275642 A1* | 11/2012 | Aller et al. | 382/100 |
| 2012/0293447 A1* | 11/2012 | Heng et al. | 345/174 |
| 2013/0141344 A1* | 6/2013 | Oh | 345/173 |
| 2013/0286302 A1* | 10/2013 | Fujioka et al. | 349/12 |
| 2014/0035871 A1* | 2/2014 | Karpin et al. | 345/174 |
| 2014/0139431 A1* | 5/2014 | Tseng et al. | 345/158 |

OTHER PUBLICATIONS

Westerman, Wayne. Hand tracking, finger identification, and chordic manipulation on a multi-touch surface. Diss. University of Delaware, 1999.*

Rubine, Dean Harris. The automatic recognition of gestures. Diss. University of Toronto, 1991.*

* cited by examiner

TOUCH PROCESSING METHOD AND SYSTEM USING A GUI IMAGE

BACKGROUND OF THE INVENTION

1. Field of the Invention

The present invention relates to a touch processing method and system, especially to a touch processing method and system using a GUI (Graphical User Interface) image.

2. Description of the Related Art

Prior art touch processing methods generally use an X-Y sensor array to detect a touch coordinate, and then transmit the touch coordinate to activate a corresponding function. However, when the X-Y sensor array is of a large size, the generation of the touch coordinate can take much time, and the activation of the corresponding function can be therefore too late to keep up with a user's touch operation.

To solve the foregoing problem, the present invention proposes a novel touch processing mechanism, which uses a GUI image to improve the efficiency in processing a touch operation.

SUMMARY OF THE INVENTION

One objective of the present invention is to disclose a touch processing method using a GUI image, so as to detect touched objects in a GUI more efficiently, and provide multiple novel touch functions without the need of calculating touch coordinates.

Another objective of the present invention is to disclose a touch processing system using a GUI image, so as to detect touched objects in a GUI more efficiently, and provide multiple novel touch functions without the need of calculating touch coordinates.

To attain the foregoing objectives, a touch processing method using a GUI image is proposed, the method including the steps of:

reading a sensed data array from a touch panel;

performing a conversion procedure on a GUI to generate a GUI image; and performing a touch processing procedure according to the sensed data array and the GUI image.

The touch panel has a touch sensor array of resistive type, capacitive type, surface acoustic wave type, or electromagnetic type.

The sensed data array is used for conveying touched information or approached information of a touch plane, and the GUI image has a background area corresponding to the touch plane, wherein the background area contains a plurality of icons, with each of the icons representing an object.

Preferably, the conversion procedure is one selected from the group consisting of a color conversion procedure and a resolution conversion procedure.

In one embodiment, the touch processing procedure has a first function, wherein the first function is used for mapping at least one touch coordinate, which is conveyed by the sensed data array, onto the icons of the GUI image, so as to activate the object function of at least one of the icons corresponding to the at least one touch coordinate.

In another embodiment, the touch processing procedure has a second function, wherein the second function is used for performing an image operation on the sensed data array according to the icons of the GUI image, so as to locate at least one of the icons and activate the object function thereof.

In still another embodiment, the touch processing procedure has a third function, wherein the third function is used for executing an image processing procedure to combine the sensed data array and the GUI image, and thereby generate an output image.

In still another embodiment, the touch processing procedure has a first function and a second function, wherein the first function is used for mapping at least one touch coordinate, which is conveyed by the sensed data array, onto the icons of the GUI image, so as to activate the object function of at least one of the icons corresponding to the at least one touch coordinate; and the second function is used for performing an image operation on the sensed data array according to the icons of the GUI image, so as to locate at least one of the icons and activate the object function thereof.

In still another embodiment, the touch processing procedure has a first function and a third function, wherein the first function is used for mapping at least one touch coordinate, which is conveyed by the sensed data array, onto the icons of the GUI image, so as to activate the object function of at least one of the icons corresponding to the at least one touch coordinate; and the third function is used for executing an image processing procedure to combine the sensed data array and the GUI image, and thereby generate an output image.

In still another embodiment, the touch processing procedure has a second function and a third function, wherein the second function is used for performing an image operation on the sensed data array according to the icons of the GUI image, so as to locate at least one of the icons and activate the object function thereof; and the third function is used for executing an image processing procedure to combine the sensed data array and the GUI image, and thereby generate an output image.

In still another embodiment, the touch processing procedure has a first function, a second function, and a third function, wherein the first function is used for mapping at least one touch coordinate, which is conveyed by the sensed data array, onto the icons of the GUI image, so as to activate the object function of at least one of the icons corresponding to the at least one touch coordinate; the second function is used for performing an image operation on the sensed data array according to the icons of the GUI image, so as to locate at least one of the icons and activate the object function thereof; and the third function is used for executing an image processing procedure to combine the sensed data array and the GUI image, and thereby generate an output image.

Preferably, the image operation includes a convolution operation and a comparison operation.

Preferably, the image processing procedure includes a filtering operation.

Preferably, the third function is used in a multi-touch drawing application, a handwriting input application, a palm-touch control application, or a multi-finger music performing application.

To attain the foregoing objectives, a touch processing system using a GUI image is proposed, the system including:

a touch panel, used for outputting a sensed data array; and a touch processing unit, used for: reading the sensed data array from the touch panel; performing a conversion procedure on a GUI to generate a GUI image; and performing a touch processing procedure according to the sensed data array and the GUI image.

The touch panel has a touch sensor array of resistive type, capacitive type, surface acoustic wave type, or electromagnetic type.

The sensed data array is used for conveying touched information or approached information of a touch plane. The conversion procedure is one selected from the group consisting of a color conversion procedure and a resolution conversion procedure, and the GUI image has a background area corresponding to the touch plane, wherein the background area contains a plurality of icons, with each of the icons representing an object.

The touch processing procedure has a function selected from a group consisting of a first function, a second function, and a third function, wherein the first function is used for mapping at least one touch coordinate, which is conveyed by the sensed data array, onto the icons of the GUI image, so as to activate the object function of at least one of the icons corresponding to the at least one touch coordinate; the second function is used for performing an image operation on the sensed data array according to the icons of the GUI image, so as to locate at least one of the icons and activate the object function thereof; and the third function is used for executing an image processing procedure to combine the sensed data array and the GUI image, and thereby generate an output image.

Preferably, the image operation includes a convolution operation and a comparison operation.

Preferably, the image processing procedure includes a filtering operation.

Preferably, the third function is used in a multi-touch drawing application, a handwriting input application, a palm-touch control application, or a multi-finger music performing application.

Preferably, the touch processing system using a GUI image further includes an object function execution unit, used for executing an object function under the control of the touch processing unit.

Preferably, the object function includes playing a film, playing music, displaying figures, or connecting to a website.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
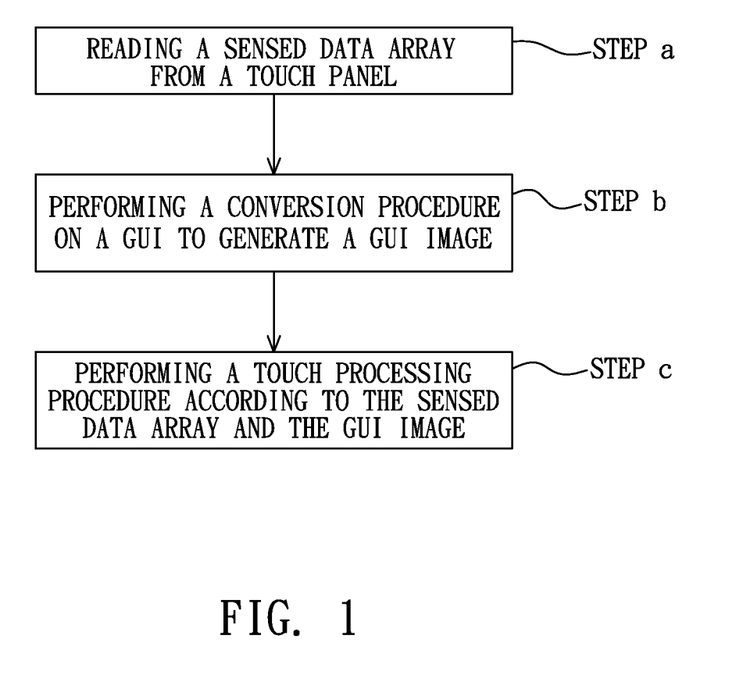
FIG. 1 illustrates the flowchart of a touch processing method using a GUI image according to a preferred embodiment of the present invention.

Please refer to FIG. 1, which illustrates the flowchart of a touch processing method using a GUI image according to a preferred embodiment of the present invention. As illustrated in FIG. 1, the method includes the steps of: reading a sensed data array from a touch panel (step a); performing a conversion procedure on a GUI to generate a GUI image (step b); and performing a touch processing procedure according to the sensed data array and the GUI image (step c).

In step a, the touch panel has a touch sensor array of resistive type, capacitive type, surface acoustic wave type, or electromagnetic type; and the sensed data array is used for conveying touched information or approached information of a touch plane.

In step b, the GUI image has a background area corresponding to the touch plane, wherein the background area contains a plurality of icons, with each of the icons representing an object. Besides, the conversion procedure is one selected from the group consisting of a color conversion procedure and a resolution conversion procedure, used for making the GUI image possess a specific color or a specific resolution.

In step c, the touch processing procedure has a function selected from a group consisting of a first function, a second function, and a third function, that is, the embodiment of the touch processing procedure can be one having the first function, or one having the second function, or one having the third function, or one having the first function and the second function, or one having the first function and the third function, or one having the second function and the third function, or one having the first function, the second function, and the third function.

The first function is used for mapping at least one touch coordinate, which is conveyed by the sensed data array, onto the icons of the GUI image, so as to activate the object function of at least one of the icons corresponding to the at least one touch coordinate; the second function is used for performing an image operation—for example but not limited to including a convolution operation and a comparison operation—on the sensed data array according to the icons of the GUI image, so as to locate at least one of the icons and activate the object function thereof, wherein the convolution operation will generate a convolution integral, and the comparison operation will compare the convolution integral with a threshold; and the third function is used for executing an image processing procedure to combine the sensed data array and the GUI image, and thereby generate an output image, wherein the image processing procedure includes performing a filtering operation and/or a color setting operation on the sensed data array.

Figure 2:
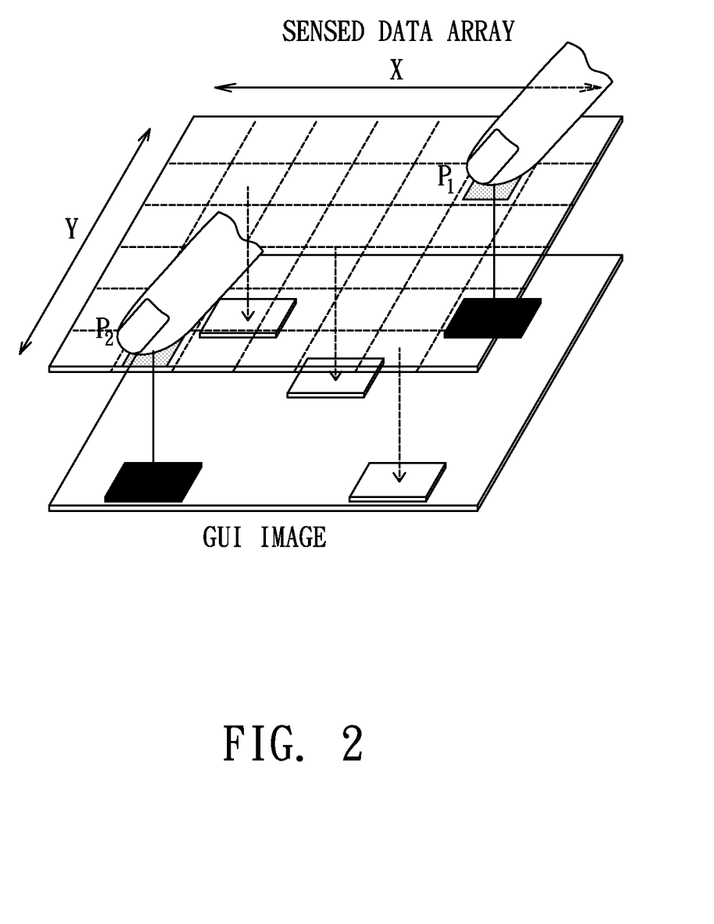
FIG. 2 illustrates an operation scenario of the first function of the touch processing procedure in the step c of FIG. 1.

For an operation scenario of the first function, please refer to FIG. 2, wherein the touch processing procedure maps two icons of a GUI image according to the coordinates of two touched points P1, P2 on a sensed data array, so as to execute the object functions of the two icons.

Figure 3:
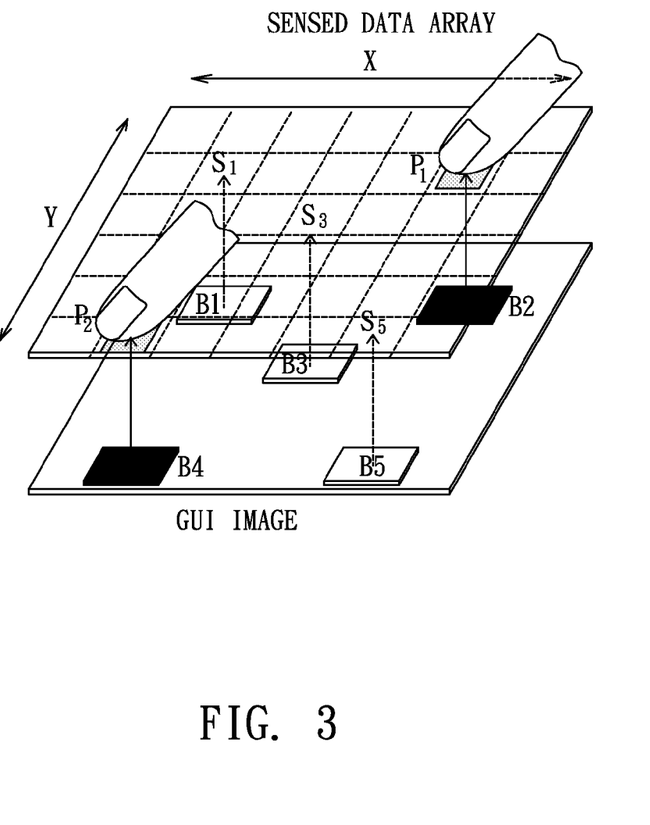
FIG. 3 illustrates an operation scenario of the second function of the touch processing procedure in the step c of FIG. 1.

For an operation scenario of the second function, please refer to FIG. 3, wherein the touch processing procedure performs an image operation on five corresponding blocks of a sensed data array respectively according to five icons B1, B2, B3, B4, and B5 of a GUI image, so as to locate the selected icons B2 and B4, and execute the object functions thereof. As illustrated in FIG. 3, there is no need of touch coordinate calculation during the process of locating B2 and B4, and executing the object functions thereof.

Figure 4:
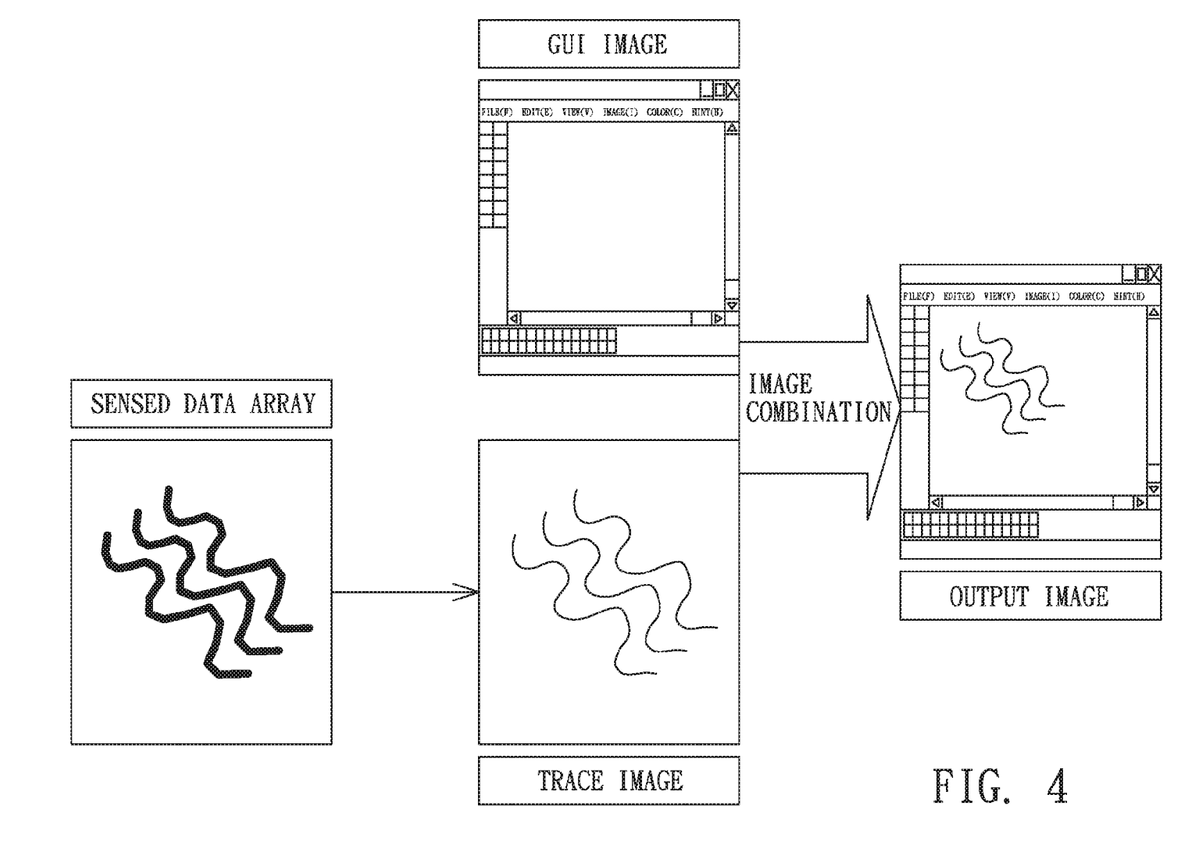
FIG. 4 illustrates an operation scenario of the third function of the touch processing procedure in the step c of FIG. 1.

For an operation scenario of the third function, please refer to FIG. 4, which illustrates a multi-touch drawing application, wherein the touch processing procedure uses an image processing procedure—including filtering and color setting—to convert a sensed data array to a trace image, and then combines the trace image with a GUI image to form an output image. As illustrated in FIG. 4, there is no need of touch coordinate calculation during the process of presenting the output image.

Figure 5:
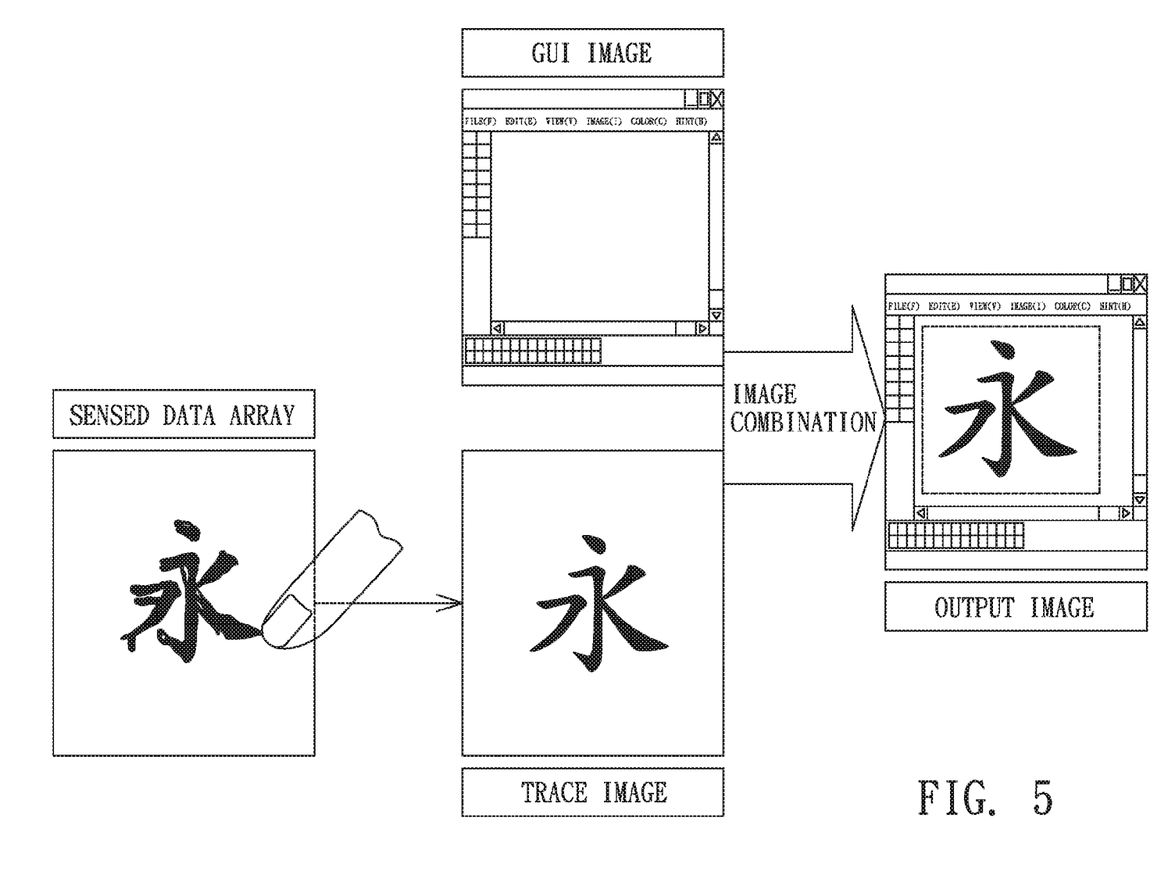
FIG. 5 illustrates another operation scenario of the third function of the touch processing procedure in the step c of FIG. 1.

For another operation scenario of the third function, please refer to FIG. 5, which illustrates a handwriting input application, wherein the touch processing procedure uses an image processing procedure—including filtering and color setting—to convert a sensed data array to a trace image, and then combines the trace image with a GUI image to form an output image. As illustrated in FIG. 5, there is no need of touch coordinate calculation during the process of presenting the output image.

Figure 6:
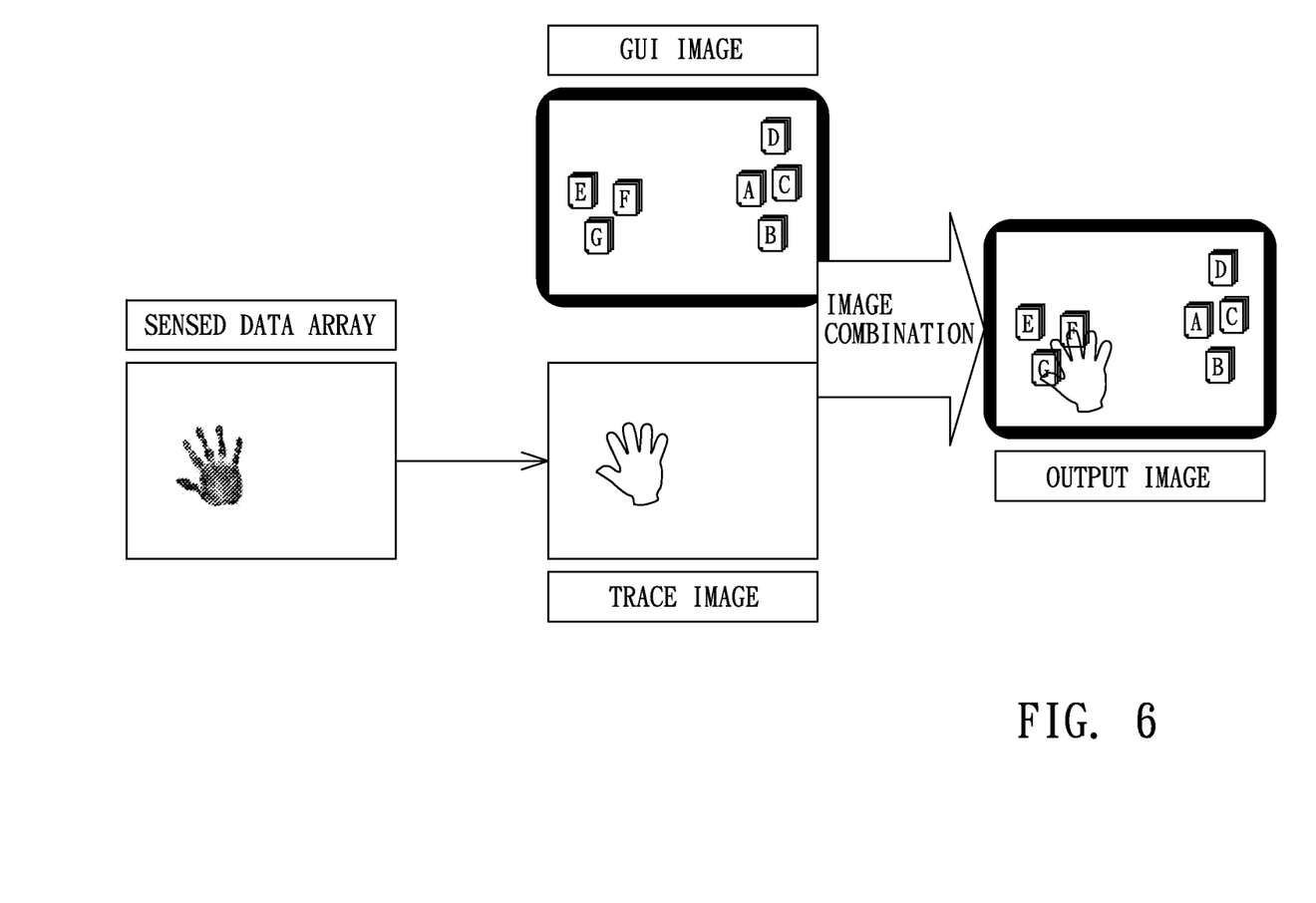
FIG. 6 illustrates another operation scenario of the third function of the touch processing procedure in the step c of FIG. 1.

For another operation scenario of the third function, please refer to FIG. 6, which illustrates a palm-touch control application, wherein the touch processing procedure uses an image processing procedure—including filtering and color setting—to convert a sensed data array to a trace image, and then combines the trace image with a GUI image—including objects A-G—to form an output image. As illustrated in FIG. 6, there is no need of touch coordinate calculation during the process of presenting the output image.

Figure 7:
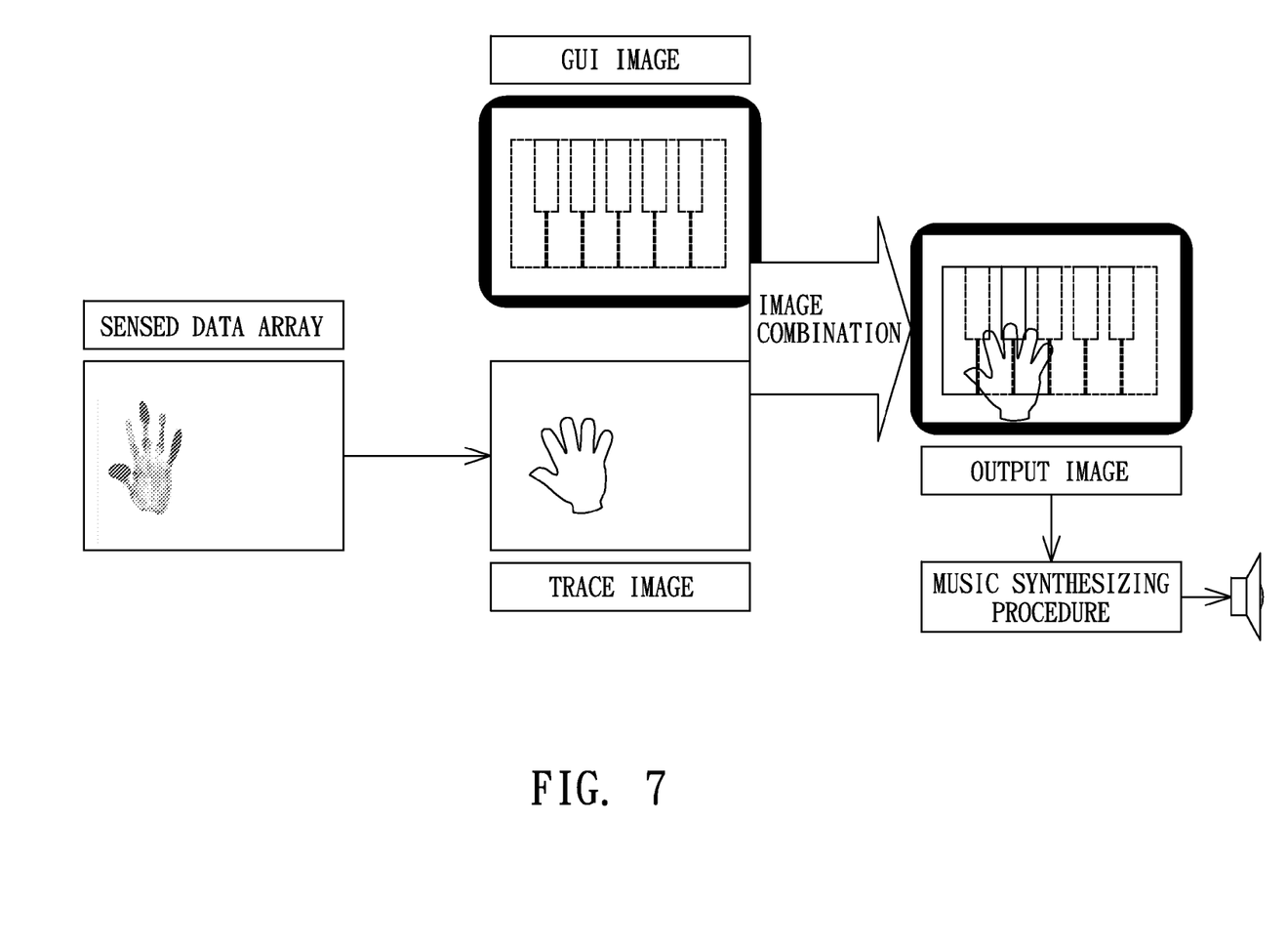
FIG. 7 illustrates still another operation scenario of the third function of the touch processing procedure in the step c of FIG. 1.

For still another operation scenario of the third function, please refer to FIG. 7, which illustrates a multi-touch music performing application, wherein the touch processing procedure uses an image processing procedure—including filtering and color setting—to convert a sensed data array to a trace image, combines the trace image with a GUI image—including a keyboard object—to form an output image, and then uses the output image to activate a music synthesizing procedure to generate corresponding music. As illustrated in FIG. 7, there is no need of touch coordinate calculation during the process of presenting the output image.

Figure 8:
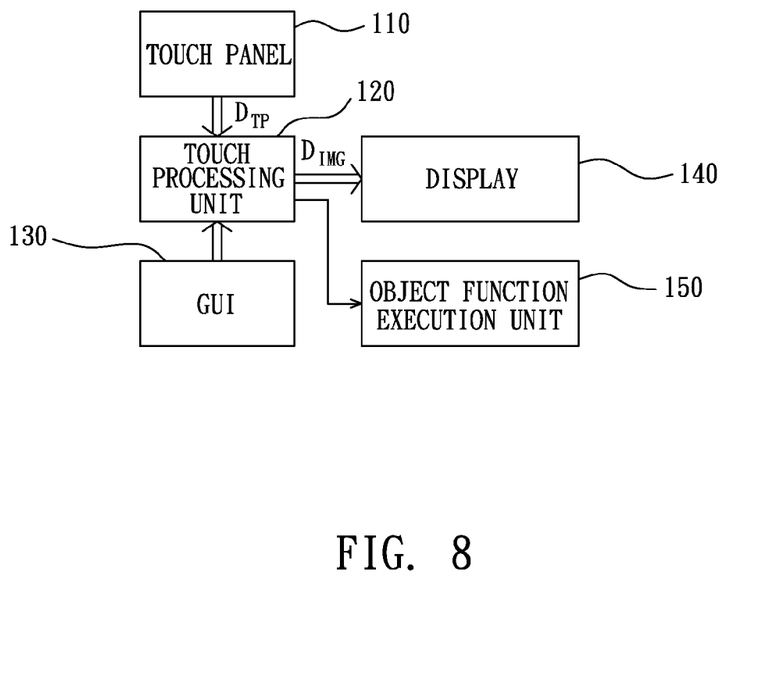
FIG. 8 illustrates the block diagram of the touch processing system according to a preferred embodiment of the present invention.

According to the foregoing specification, the present invention further proposes a touch processing system using a GUI image. Please refer to FIG. 8, which illustrates the block diagram of the touch processing system according to a preferred embodiment of the present invention. As illustrated in FIG. 8, the touch processing system includes a touch panel 110, a touch processing unit 120, a GUI 130, a display 140, and an object function execution unit 150.

The touch panel 110 has a touch sensor array of resistive type, capacitive type, surface acoustic wave type, or electromagnetic type; and has an output port $D_{TP}$ for delivering a sensed data array.

The touch processing unit 120 is used for: reading the sensed data array from the touch panel 110; performing a conversion procedure on the GUI 130 to generate a GUI image; and performing a touch processing procedure according to the sensed data array and the GUI image. The sensed data array is used for conveying touched information or approached information of a touch plane. The GUI image has a background area corresponding to the touch plane, wherein the background area contains a plurality of icons, with each of the icons representing an object. Besides, the conversion procedure is one selected from the group consisting of a color conversion procedure and a resolution conversion procedure, used for making the GUI image possess a specific color or a specific resolution.

The touch processing procedure has a function selected from a group consisting of a first function, a second function, and a third function, wherein the first function is used for mapping at least one touch coordinate, which is conveyed by the sensed data array, onto the icons of the GUI image, so as to activate the object function execution unit 150 to execute the object function of at least one of the icons corresponding to the at least one touch coordinate; the second function is used for performing an image operation—for example but not limited to a convolution operation and a comparison operation—on the sensed data array according to the icons of the GUI image, so as to locate at least one of the icons and activate the object function execution unit 150 to execute the object functions thereof, wherein the convolution operation will generate a convolution integral, and the comparison operation will compare the convolution integral with a threshold; and the third function is used for executing an image processing procedure to combine the sensed data array and the GUI image, and thereby deliver an output image $D_{IMG}$ to the display 140, wherein the image processing procedure includes performing a filtering operation and/or a color setting operation on the sensed data array.

The GUI 130 has a background area corresponding to the touch plane of the touch panel 110, wherein the background area contains a plurality of icons, with each of the icons representing an object.

The display 140 can be a liquid crystal display, an organic/non-organic LED display, or an e-paper display.

The object function execution unit 150 is used for playing a film, playing music, displaying figures, or connecting to a website, etc.

Preferably, the touch processing unit 120 utilizes a CPU/GPU to execute the touch processing procedure, so as to relieve the workload of the touch panel 110, and simplify the architecture of the touch panel 110. By using the powerful capacity of the CPU/GPU, the present invention's touch processing system can therefore execute relative image processing procedures in a high speed, so as to provide a novel touch control mechanism and multiple novel touch functions—including a function of multi-touch drawing, a function of handwriting input, a function of palm-touch control, and a function of multi-finger music performing.

In conclusion, the touch processing method and system using a GUI image of the present invention can relieve the workload of a touch panel, simplify the architecture of the touch panel, locate touched objects on a GUI more efficiently, and provide multiple novel touch functions. Compared to prior art touch processing method and system, the present invention possesses superior advantages.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch processing method for a graphical user interface, the method including the steps of:
   using a processing unit including at least one CPU or GPU to read a sensed data array from a touch panel, wherein said sensed data array is generated in the touch panel without going through a process for calculating touch coordinates;
   using said processing unit to perform a conversion procedure on a GUI to generate a GUI image, wherein said GUI image has a background area corresponding to a touch plane of said touch panel, and said background area contains a plurality of icons with each of said icons representing an object; and
   using said processing unit for performing a touch processing procedure, wherein said touch processing procedure uses said sensed data array to get touched position information or uses both said sensed data array and said icons of said GUI image to get touched icon information for locating or indicating at least one of said icons and activate the object function thereof.

2. The touch processing method for a graphical user interface using a GUI imago of claim 1, wherein said touch panel has a touch sensor array selected from a group consisting of resistive type, capacitive type, surface acoustic wave type, and electromagnetic type.

3. The touch processing method for a graphical user interface of claim 1, wherein said conversion procedure is selected from a group consisting of a color conversion procedure and a resolution conversion procedure.

4. The touch processing method for a graphical user interface of claim 1, wherein said touch processing procedure performed in the processing unit has a first function for mapping at least one touch coordinate, which is derived by processing said sensed data array in the processing unit, onto said icons of said GUI image, so as to activate the object function of at least one of said icons corresponding to said at least one touch coordinate.

5. The touch processing method for a graphical user interface of claim 1, wherein said touch processing procedure performed in the processing unit has a first function and a second function, wherein said first function is used for mapping at least one touch coordinate, which is derived by processing said sensed data array in the processing unit, onto said icons of said GUI image, so as to activate the object function of at least one of said icons corresponding to said at least one touch coordinate; and said second function is used for performing an image operation on said sensed data array according to said icons of said GUI image, so as to locate at least one of said icons and activate the object function thereof.

6. The touch processing method for a graphical user interface of claim 1, wherein said touch processing procedure performed in the processing unit has a first function and a third function, wherein said first function is used for mapping at least one touch coordinate, which is derived by processing said sensed data array in the processing unit, onto said icons of said GUI image, so as to activate the object function of at least one of said icons corresponding to said at least one touch coordinate; and said third function is used for executing an image processing procedure to combine said sensed data array and said GUI image, and thereby generate an output image.

7. The touch processing method for a graphical user interface of claim 1, wherein said touch processing procedure performed in the processing unit has a second function and a third function, wherein said second function is used for performing an image operation on said sensed data array according to said icons of said GUI image, so as to locate at least one of said icons and activate the object function thereof; and said third function is used for executing an image processing procedure to combine said sensed data array and said GUI image, and thereby generate an output image.

8. The touch processing method for a graphical user interface of claim 1, wherein said touch processing procedure performed in the processing unit has a first function, a second function, and a third function, wherein said first function is used for mapping at least one touch coordinate, which is derived by processing said sensed data array in the processing unit, onto said icons of said GUI image, so as to activate the object function of at least one of said icons corresponding to said at least one touch coordinate; said second function is used for performing an image operation on said sensed data array according to said icons of said GUI image, so as to locate at least one of said icons and activate the object function thereof; and said third function is used for executing an image processing procedure to combine said sensed data array and said GUI image, and thereby generate an output image.

9. The touch processing method for a graphical user interface claim 1, wherein said touch processing procedure performed in the processing unit has a second function for performing an image operation on said sensed data array according to said icons of said GUI image, so as to locate at least one of said icons and activate the object function thereof.

10. The touch processing method for a graphical user interface of claim 9, wherein said image operation includes a convolution operation and a comparison operation, wherein the convolution operation will generate a convolution integral, and the comparison operation will compare the convolution integral with a threshold.

11. The touch processing method for a graphical user interface of claim 1, wherein said touch processing procedure performed in the processing unit has a third function for executing an image processing procedure to combine said sensed data array and said GUI image, and thereby generate an output image.

12. The touch processing method for a graphical user interface of claim 11, wherein said image processing procedure includes a filtering operation.

13. The touch processing method for a graphical user interface of claim 11, wherein said third function is used for an application selected from the group consisting of: a multi-touch drawing application, a handwriting input application, a palm-touch control application, and a multi-finger music performing application.

14. A touch processing system using a graphical user interface, comprising:
   a touch panel for outputting a sensed data array corresponding to user interaction therewith, wherein said sensed data array is generated in the touch panel without going through a process for calculating touch coordinates; and
   a processing unit for reading said sensed data array from said touch panel; performing a conversion procedure on a GUI to generate a GUI image; and performing a touch processing procedure, wherein said touch processing procedure uses said sensed data array to get touched position information or uses both said sensed data array and said icons of said GUI image to get touched icon information for locating or indicating at least one of said icons and activate the object function thereof.

15. The touch processing system using a graphical user interface of claim 14, further comprising an object function execution unit, used for executing an object function under the control of said touch processing unit.

16. The touch processing system using a graphical user interface of claim 14, wherein said sensed data array is generated from a sensing operation of a touch plane of said touch panel, and is used for said processing unit to derive touched information or approached information of said touch plane; said conversion procedure is selected from the group consisting of a color conversion procedure and a resolution conversion procedure; and said GUI image has a background area corresponding to said touch plane, wherein said background area contains a plurality of icons, with each of said icons representing an object.

17. The touch processing system using a graphical user interface of claim 16, wherein said touch processing procedure has a function selected from a group consisting of a first function, a second function, and a third function, wherein said first function is used for mapping at least one touch coordinate, which is derived by processing said sensed data array in the processing unit, onto said icons of said GUI image, so as to activate the object function of at least one of said icons corresponding to said at least one touch coordinate; said second function is used for performing an image operation on said sensed data array according to said icons of said GUI image, so as to locate at least one of said icons and activate the object function thereof; and said third function is used for executing an image processing procedure to combine said sensed data array and said GUI image, and thereby generate an output image.

18. The touch processing system using a graphical user interface of claim 17, wherein said image operation includes a convolution operation and a comparison operation, and said image processing procedure includes a filtering operation.

19. The touch processing system using a graphical user interfaces of claim 17, wherein said image processing procedure is used for an application selected from the group consisting of a multi-touch drawing application, a handwriting input application, a palm-touch control application, and a multi-finger music performing application.

\* \* \* \* \*